United States Patent
Tokumaru et al.

(10) Patent No.: US 7,246,606 B2
(45) Date of Patent: Jul. 24, 2007

(54) FUEL RETURN DEVICE FOR INTERNAL COMBUSTION ENGINE

(75) Inventors: Takeshi Tokumaru, Fujisawa (JP); Takeshi Seto, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 86 days.

(21) Appl. No.: 10/524,336

(22) PCT Filed: Aug. 8, 2003

(86) PCT No.: PCT/JP03/10132

§ 371 (c)(1),
(2), (4) Date: Feb. 11, 2005

(87) PCT Pub. No.: WO2004/016934

PCT Pub. Date: Feb. 26, 2004

(65) Prior Publication Data

US 2005/0224057 A1    Oct. 13, 2005

(30) Foreign Application Priority Data

Aug. 13, 2002 (JP) ............................. 2002-235465

(51) Int. Cl.
*F02M 37/00* (2006.01)
(52) U.S. Cl. .................................................. 123/514
(58) Field of Classification Search ................ 123/509, 123/510, 511, 514
See application file for complete search history.

(56) References Cited

U.S. PATENT DOCUMENTS

| | | | | |
|---|---|---|---|---|
| 4,543,938 A | * | 10/1985 | Szlaga .......................... | 123/514 |
| 4,773,260 A | * | 9/1988 | Ohno et al. ................... | 73/113 |
| 5,020,566 A | * | 6/1991 | Shoop .......................... | 137/265 |
| 5,163,466 A | * | 11/1992 | Moody ......................... | 137/255 |
| 5,197,443 A | * | 3/1993 | Hodgkins ..................... | 123/514 |
| 5,303,685 A | * | 4/1994 | Forgacs ........................ | 123/510 |
| 5,335,638 A | * | 8/1994 | Mukai .......................... | 123/520 |
| 5,425,344 A | * | 6/1995 | Otsuka et al. ................ | 123/520 |
| 5,743,239 A | * | 4/1998 | Iwase ........................... | 123/514 |
| 5,960,809 A | | 10/1999 | Keller .......................... | 137/12 |

(Continued)

FOREIGN PATENT DOCUMENTS

JP        63-52960        3/1988

(Continued)

OTHER PUBLICATIONS

PCT Search Report for Serial No. PCT/JP2003/010132 dated Nov. 11, 2003.

(Continued)

*Primary Examiner*—Thomas Moulis
(74) *Attorney, Agent, or Firm*—McCormick, Paulding & Huber LLP

(57) ABSTRACT

The object of the present invention is to provide a fuel return device whereby the residual amounts of fuel in a plurality of fuel tanks can be made approximately equal. According to one preferred mode of the present invention, the fuel return device comprises: residual amount detecting means for detecting the residual amount of fuel in respective fuel tanks; and fuel return distribution adjusting means for adjusting the distribution of the fuel returning to the respective fuel tanks, in accordance with the values detected by the residual amount detecting means, in such a manner that the residual amounts of fuel inside each of the fuel tanks are approximately equal.

13 Claims, 3 Drawing Sheets

U.S. PATENT DOCUMENTS

| | | | |
|---|---|---|---|
| 6,267,104 B1 | 7/2001 | Monnier | 123/178 |
| 6,405,744 B1 * | 6/2002 | LaPant | 137/1 |
| 6,494,226 B2 * | 12/2002 | Tipton et al. | 137/1 |
| 2001/0035215 A1 * | 11/2001 | Tipton et al. | 137/571 |
| 2003/0056824 A1 * | 3/2003 | Harvey | 137/265 |
| 2004/0020474 A1 | 2/2004 | Pratt et al. | 123/514 |

FOREIGN PATENT DOCUMENTS

| | | |
|---|---|---|
| JP | 64-41665 | 3/1989 |
| JP | 3-17272 | 2/1991 |
| JP | 11-264352 | 9/1999 |

OTHER PUBLICATIONS

EPC Search Report for Serial No. EP 03 78 8060 dated Aug. 29, 2005.

* cited by examiner

FUEL RETURN DEVICE FOR INTERNAL COMBUSTION ENGINE

CROSS-REFERENCE TO RELATED APPLICATIONS

This application is entitled to the benefit of and incorporates by reference essential subject matter disclosed in International Patent Application No. PCT/JP2003/010132 filed on Aug. 8, 2003 and Japanese Patent Application No. 2002-235465 filed on Aug. 13, 2002.

BACKGROUND OF THE INVENTION

1. Technical Field

The present invention relates to a fuel return device for recovering surplus fuel of the fuel supplied to an internal combustion engine simultaneously from a plurality of fuel tanks, and returning same to the fuel tanks, and more particularly, to a fuel return device whereby the residual amounts of fuel in the respective fuel tanks can be made equal.

2. Background Art

Recently, a DME internal combustion engine which uses dimethyl ether (hereinafter, called "DME") as an alternative fuel instead of gasoline or diesel oil, has become known.

A fuel supply system for a DME internal combustion engine (hereinafter, simply called "engine") is described with reference to FIG. 3.

In this fuel supply system, two fuel tanks 31a and 31b filled with fuel (DME) are provided in the chassis of the vehicle (not illustrated). Pressure feed pumps 32a and 32b for supplying DME under pressure are provided respectively at the fuel tanks 31a and 31b. The fuel inside the fuel tanks 31a and 31b is supplied respectively by the pressure feed pumps 32a and 32b to a fuel pipe 33, and the pressure of the fuel is raised by a secondary pump 34. Thereupon, the fuel is supplied to a supply pump 35 provided in the engine E. A common rail 37 for accumulating pressurized fuel that is to be injected is connected to the supply pump 35, and a plurality of fuel injection valves (injectors) 36 for injecting fuel into the combustion chambers of the respective cylinders of the engine E, are connected to the common rail 37. The supply pump 35 raises the fuel to a pressure suitable for injecting into the combustion chamber, and supplies the fuel to the common rail 37.

The secondary pump 34 and the supply pump 35 are pressure control pumps which are capable of adjusting the output pressure, and they are connected respectively to fuel recovery pipes 38a and 38b which serve to return surplus fuel that has been discharged from the pumps 34 and 35, to the fuel tanks 31a and 31b. A fuel recovery pipe 38c for returning surplus fuel discharged from the common rail 37 to the fuel tanks 31a and 31b is connected to an intermediate point of the fuel recovery pipe 38b. A pressure control valve (PCV) 40 is provided in the fuel recovery pipe 38c and the pressure inside the common rail 37 is adjusted to the optimal pressure for fuel injection. The fuel recovery pipes 38a and 38b are joined to a single main fuel return pipe 39. Therefore, the surplus fuel from the secondary pump 34, the supply pump 35 and the common rail 37 is all recovered into the main fuel return pipe 39. Two subsidiary fuel return pipes 44a and 44b branch off from the downstream end of the main fuel return pipe 39, and these subsidiary fuel return pipes 44a and 44b are connected respectively to the fuel tanks 31a and 31b. The surplus fuel recovered into the main fuel return pipe 39 is divided between these subsidiary fuel return pipes 44a and 44b and returned to the respective fuel tanks 31a and 31b via the same. In the diagram, numeral 43 denotes a fuel cooler and numeral 45 denotes a fuel shut-off valve.

Here, the amount of heat generated by the DME is approximately 28.8 MJ/kg, which is relatively low compared to the figure of approximately 42.7 MJ/kg in the case of diesel oil. Therefore, it is necessary to increase the amount of fuel injected into the engine in order to obtain output performance equivalent to that of a diesel engine running on diesel oil. Accordingly, the amount of fuel consumed becomes very large, and in order to allow the vehicle to travel a long distance with one filling of the full tank, it is necessary to increase the capacity of the fuel tank. Therefore, a plurality of fuel tanks 31a and 31b may be provided in the vehicle, as illustrated in FIG. 3. Furthermore, in some cases, the fuel tanks are divided into a plurality of separate bodies, due to layout criteria.

In a vehicle that is fitted with a plurality of fuel tanks, if the fuel in the respective fuel tanks is used in a sequential fashion such that the supply of fuel switches from one fuel tank to the next fuel tank when one fuel tank has become empty, then it is necessary to provide a large-capacity pressure feed pump, respectively, at each fuel tank due to the fact that a DME requires a large amount of fuel to be supplied to the fuel injection valves, as described previously. This leads to increased costs. Moreover, providing a large pressure feed pump inside each fuel tank may also be problematic in terms of space.

Therefore, in the fuel supply system illustrated in FIG. 3, fuel is supplied to the fuel injection valves 36 simultaneously from each of the fuel tanks 31a and 31b. More specifically, the pressure feed pumps 32a and 32b of the plurality of fuel tanks 31a and 31b are actuated simultaneously. In so doing, it becomes possible to use pressure feed pumps 32a and 32b of relatively smaller capacity in the respective fuel tanks 31a and 31b.

If fuel is supplied simultaneously from a plurality of fuel tanks 31a and 31b, then the surplus fuel from the secondary pump 34, the supply pump 35 and the common rail 37 is distributed between the respective fuel tanks 31a and 31b.

However, there may be cases where the temperatures and pressures inside the fuel tanks 31a and 31b are not equal, due to the use conditions of the vehicle, the driving conditions, or the like. Consequently, the amount of fuel branching off from the main fuel return pipe 39 into the respective subsidiary fuel return pipes 44a and 44b and flowing from these into the respective fuel tanks 31a and 31b is not equal, and hence a problem arises in that the rate of reduction (the residual amount) of the fuel inside the fuel tanks 31a and 31b becomes unequal. In a worst case scenario, one of the fuel tanks 31a or 31b may become empty before the other fuel tank and hence the corresponding pressure feed pump 32a or 32b may be driven without fuel, thereby causing damage to the pump.

SUMMARY OF THE INVENTION

It is an object of the present invention to provide a fuel return device whereby the residual amounts of fuel in a plurality of fuel tanks can be made approximately equal.

In order to achieve the aforementioned object, the present invention is a fuel return device for an internal combustion engine for recovering surplus fuel of the fuel supplied to the internal combustion engine simultaneously from a plurality of fuel tanks, and returning the recovered fuel to the respective fuel tanks; comprising: residual amount detecting means for detecting the residual amount of fuel in the respective fuel tanks; and fuel return distribution adjusting means for adjusting the distribution of the fuel returning to the respective fuel tanks, in accordance with the values detected by the residual amount detecting means, in such a manner that the residual amounts of fuel inside each of the fuel tanks are approximately equal.

Here, the fuel return distribution adjusting means may comprise: a flow rate control valve for adjusting the distribution of the flow rate of the fuel returning to the respective fuel tanks; and control means for controlling the flow rate control valve in accordance with the values detected by the residual amount detecting means.

Moreover, two fuel tanks may be provided, and a first return passage for recovering surplus fuel, and two second return passages branching respectively from the downstream end of the first return passage and connecting respectively to the two fuel tanks, may also be provided; the fuel return distribution adjusting means comprising: a flow rate control valve interposed in one of the second return passages; control means for controlling the flow rate control valve in accordance with the values detected by the residual amount detecting means; and flow rate restricting means interposed in the other of the second return passages.

Furthermore, the internal combustion engine may comprise a common rail for accumulating pressurized fuel that is to be injected; each of the fuel tanks may respectively comprise a fuel pressure feed pump; and at least one pressure adjusting pump capable of adjusting the output pressure is interposed between the fuel pressure feed pumps and the common rail; the fuel discharged from the common rail and the fuel discharged from the pressure adjusting pump being returned to the fuel tanks.

The fuel may have the property of assuming a gaseous form at normal temperature and atmospheric pressure, and assume a liquid form when pressurized to a pressure above atmospheric pressure when being used.

The fuel may be dimethyl ether.

Other objects, compositional aspects, actions and beneficial effects of the present invention will become apparent to a person skilled in the art, upon reading and understanding the following detailed description of the invention.

DETAILED DESCRIPTION OF THE PREFERRED EMBODIMENTS

Below, a preferred embodiment of the present invention is described with reference to the accompanying drawings.

Figure 1:
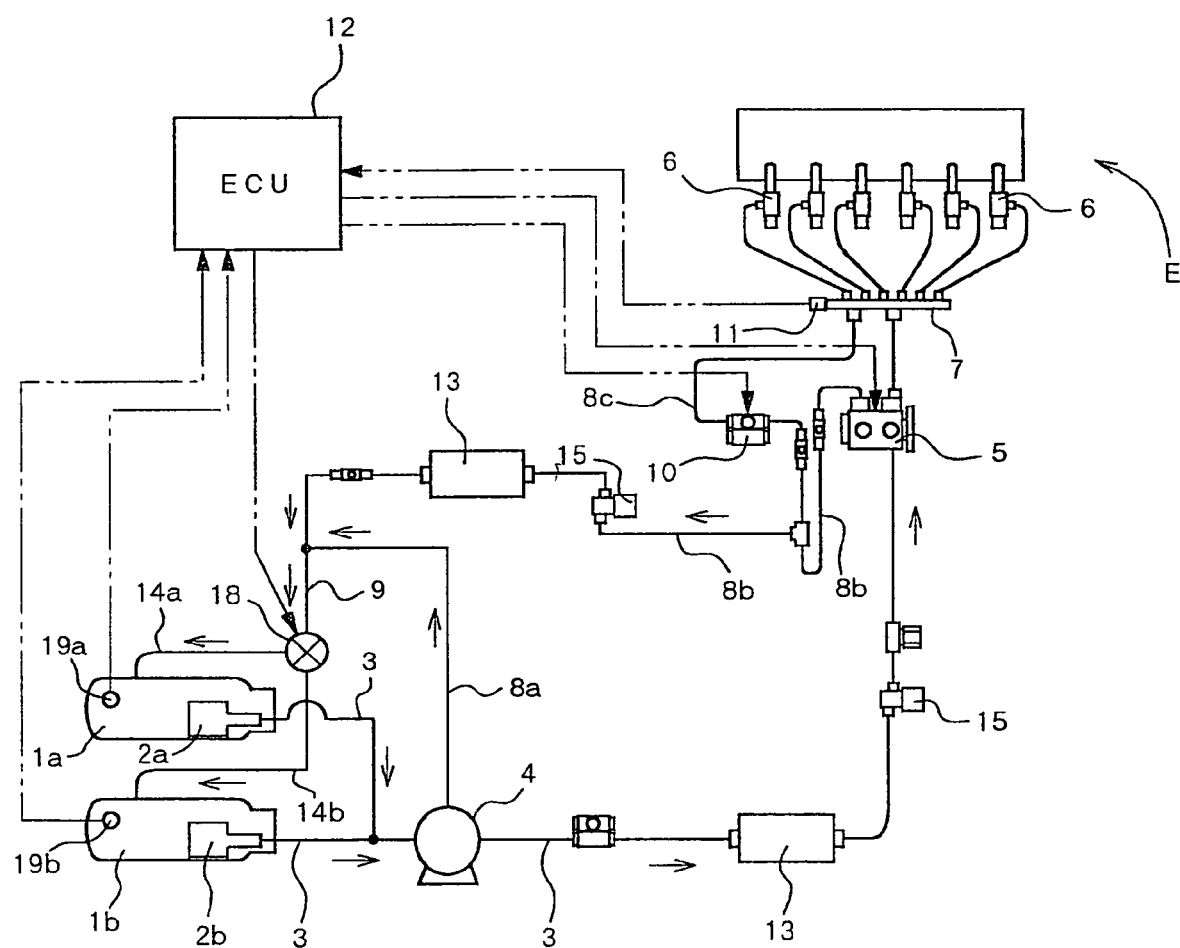
FIG. 1 is a schematic diagram of a fuel return device relating to one embodiment of the present invention.

The present embodiment is applied to a DME engine which is provided with two fuel tanks containing dimethyl ether (hereinafter, DME), wherein fuel is supplied simultaneously from both fuel tanks, and firstly, it is described with respect to a fuel supply system for a DME engine as illustrated in FIG. 1. DME has a gaseous form at normal temperature and atmospheric pressure, but in this fuel supply system, it is always pressurized to a higher pressure than atmospheric pressure, and hence it is used in a liquid state.

In the fuel supply system according to the present embodiment, two fuel tanks 1a and 1b filled with fuel (DME) are provided on the chassis of the vehicle (not illustrated). Pressure feed pumps 2a and 2b for supplying DME under pressure are provided respectively inside the fuel tanks 1a and 1b. The fuel inside the fuel tanks 1a and 1b is conveyed into the fuel pipe 3 by means of the pressure feed pumps 2a and 2b, and the pressure of the fuel is then raised by the secondary pump 4. Thereupon, the fuel is supplied to a supply pump 5 provided in the engine E. A common rail 7 for accumulating pressurized fuel that is to be injected is connected to the supply pump 5, and a plurality of fuel injection valves (injectors) 6 for injecting the fuel into the combustion chambers of the respective cylinders of the engine E are connected to the common rail 7. The supply pump 5 raises the fuel to a pressure suitable for injection into the combustion chamber and conveys the fuel to the common rail 7.

The secondary pump 4 and the supply pump 5 are pressure control pumps provided with pressure control valves which are capable of adjusting the output pressure, and they are connected respectively to fuel recovery pipes 8a and 8b which serve to return surplus fuel that has been discharged respectively from the pumps 4 and 5, to the fuel tanks 1a and 1b. A fuel recovery pipe 8c for returning fuel discharged from the common rail 7, to the fuel tanks 1a and 1b, is connected to an intermediate point of the fuel recovery pipe 8b. A pressure control valve (PCV) 10 is interposed in the fuel recovery pipe 8c and hence the pressure inside the common rail 7 is adjusted to the optimal pressure for fuel injection. The fuel recovery pipes 8a and 8b are joined to a single main fuel return pipe (first return passage) 9. The surplus fuel from the secondary pump 4, the supply pump 5 and the common rail 7 is all recovered into the main fuel return pipe 9. Two subsidiary fuel return pipes (second return passages) 14a and 14b branch off from the downstream end of the main fuel return pipe 9, and these subsidiary fuel return pipes 14a and 14b are connected respectively to the fuel tanks 1a and 1b. The surplus fuel recovered into the main fuel return pipe 9 passes along the subsidiary fuel return pipes 14a and 14b and is distributed to the respective fuel tanks 1a and 1b.

A pressure sensor 11 is provided in the common rail 7 and the pressure of the fuel in the common rail 7 is detected by a pressure sensor 11. The value detected by the pressure sensor 11 is transmitted to the electronic control unit (hereinafter, called "ECU") 12. Furthermore, the aforementioned supply pump 5 and pressure control valve 10 are controlled in accordance with signals from the ECU 12. In the drawings, numeral 13 denotes a fuel cooler and numeral 15 denotes a fuel shut-off valve.

The fuel return device according to the present embodiment comprises fuel return distribution control means for making the residual amounts of fuel inside the respective fuel tanks 1a and 1b equal.

More specifically, as shown in FIG. 1, a flow control valve 18 for adjusting the distribution of the flow of fuel into the respective subsidiary fuel return pipes 14a and 14b is provided at the branching section (connecting section) of the main fuel return pipe 9 and the subsidiary fuel return pipes 14a and 14b. In the present embodiment, the flow control valve 18 is a three-way electromagnetic valve. The inlet side of the three-way electromagnetic valve 18 is connected to the main fuel return pipe 9, and two outlets thereof are connected respectively to the subsidiary fuel return pipes 14a and 14b. The three-way electromagnetic valve 18 is connected to the ECU 12 and a valve body for opening and closing the two outlets is moved in a continuous and integral fashion, in accordance with a signal from the ECU 12. By this means, the degrees of opening of the two outlets, and in particular, the ratio between the degrees of openings of the two outlets, is adjusted.

Moreover, residual amount detecting means 19a and 19b for detecting the residual amounts of fuel in the fuel tanks 1a and 1b are provided respectively in the fuel tanks 1a and 1b. In the present embodiment, the residual amount detecting means 19a and 19b is a level sensor, for example, a floating type level gauge. The residual amount detecting means 19a and 19b are connected to the ECU 12 and the values detected by same are transmitted to the ECU 12.

The ECU 12 calculates the difference between the amounts of residual fuel in the fuel tanks 1a and 1b, on the basis of the detection values from the residual amount detecting means 19a and 19b. The three-way electromagnetic valve 18 is controlled in accordance with this difference, in such a manner that the residual amounts of fuel in the respective fuel tanks 1a and 1b become equal (in such a manner that the aforementioned difference is eliminated). More specifically, by adjusting the ratio of opening of the two outlets of the three-way electromagnetic valve 18, the distribution of the flow rates of the fuel returning to the respective fuel tanks 1a and 1b by passing along the subsidiary fuel return pipes 14a and 14b is controlled.

Now, it is assumed that the degree of opening of the two outlets of the three-way electromagnetic valve 18 is the same. In this case, provided that the temperatures or the pressures of the respective fuel tanks 1a and 1b are equal, then the flows of fuel returning to the respective fuel tanks 1a and 1b via the subsidiary fuel return pipes 14a and 14b will be the same (the flow ratio will be 1:1). Thereupon, if a difference arises between the temperatures or pressures in the fuel tanks 1a and 1b, then a difference will arise between the flow rates of fuel returning to the respective fuel tanks 1a and 1b from the subsidiary fuel return pipes 14a and 14b. Consequently, a difference will arise between the residual amounts of fuel in the fuel tanks 1a and 1b. Here, an example is described wherein the amount of residual fuel in the fuel tank 1a has become less than the amount of residual fuel in the fuel tank 1b.

The ECU 12 calculates difference between the amounts of residual fuel in the fuel tanks 1a and 1b on the basis of the signal from the residual amount detecting means 19a and 19b, and the opening ratio of the outlets of the three-way electromagnetic valve 18 is controlled in response to this difference. More specifically, the degree of opening towards the subsidiary return pipe 14a that is connected to the fuel tank 1a, which has a lower residual amount of fuel, is increased, and the degree of opening towards the subsidiary return pipe 14b that is connected to the other fuel tank 1b is decreased. Thereby, the flow Fa of return fuel that returns to the fuel tank 1a becomes greater than the flow Fb of return fuel that returns to the fuel tank 1b (Fa>Fb), and hence the difference between the residual amounts of fuel in the fuel tanks 1a and 1b gradually decreases. Consequently, it is possible to make the residual amounts of fuel in the fuel tanks 1a and 1b equal.

In this way, in the present embodiment, the residual amounts of fuel inside the respective fuel tanks 1a and 1b are detected constantly, and these residual amounts of fuel are made equal by adjusting the distribution of fuel returning to the fuel tanks 1a and 1b, in accordance with the difference between the residual amounts of fuel. Therefore, the rate of decrease of the fuel in all of the fuel tanks 1a and 1b is approximately equal, and hence damage to the pressure feed pumps 2a and 2b caused by driving the pumps without fuel, or the like, can be prevented.

If the difference between the residual amounts of fuel is big, the residual amounts of fuel can be made equal for a short time by greatly changing the distribution of returning fuel to the fuel tank 1a and that to the fuel tank 1b.

Next, a further embodiment of the present invention will be described with reference to FIG. 2. Elements which are the same as those illustrated in FIG. 1 are labeled with the same reference numerals and description thereof is omitted here.

In this embodiment, in the fuel return distribution control means, a flow rate control valve 20 is interposed in either one of the subsidiary fuel return pipes 14a and 14b (in the diagram, in the subsidiary fuel return pipe 14a). In the present embodiment, the flow rate control valve 20 is a two-way electromagnetic valve. The two-way electromagnetic valve 20 is connected to the ECU 12, and the degree of opening of the valve is adjusted in a continuous fashion by means of a signal from the ECU 12. Furthermore, a diaphragm (flow rate restricting means) 21 for restricting the flow of fuel traveling along the subsidiary fuel return pipe 14b is provided in the other subsidiary fuel return pipe 14b.

The ECU 12 calculates the difference between the residual amounts of fuel in the fuel tanks 1a and 1b on the basis of signals from the residual amount detecting means 19a and 19b, and it adjusts the degree of opening of the two-way electromagnetic valve 20 in accordance with this difference. By this means, the distribution of the flow of fuel returning to the respective fuel tanks 1a and 1b along the subsidiary fuel return pipes 14a and 14b is adjusted. In other words, if the degree of opening of the electromagnetic valve 20 is made smaller than the degree of opening of the diaphragm 21, then the flow rate Fa of the fuel returning from the subsidiary return pipe 14a to the fuel tank 1a becomes smaller than the flow rate Fb of the fuel returning to the fuel tank 1b from the subsidiary fuel return pipe 14b (Fa<Fb). Conversely, if the degree of opening of the two-way electromagnetic valve 20 is made larger than the degree of opening of the diaphragm 21, then the flow rate Fa of the fuel returning to the fuel tank 1a becomes greater than the flow rate Fb of the fuel returning to the fuel tank 1b (Fa>Fb). Therefore, by calculating the difference between the residual amounts of fuel in the respective fuel tanks 1a and 1b on the basis of the values detected by the residual amount detecting means 19a and 19b, and then adjusting the degree of opening of the two-way electromagnetic valve 20 in accordance with this difference, it is possible to make the residual amounts of fuel in the fuel tanks 1a and 1b equal.

The reason for providing a diaphragm 21 in the other subsidiary fuel return pipe 14b is that, if no diaphragm 21 is provided, then it is not possible to make the flow rate Fa of the fuel returning to the fuel tank 1a greater than the flow rate Fb of the fuel returning to the fuel tank 1b. In other words, even if the two-way electromagnetic valve 20 were fully open, the flow rate Fa of fuel returning to the fuel tank 1a would only be equal to the flow rate Fb of the fuel returning to the fuel tank 1b.

According to the two embodiments described above, it is possible to make the residual amounts of fuel in the fuel tanks equal, in a comparatively inexpensive manner. In particular, the embodiment illustrated in FIG. 2 can be manufactured even more inexpensively, since it is constituted by a two-way electromagnetic valve and a simple tube (pipe) diaphragm, which are less expensive than a three-way electromagnetic valve.

Figure 2:
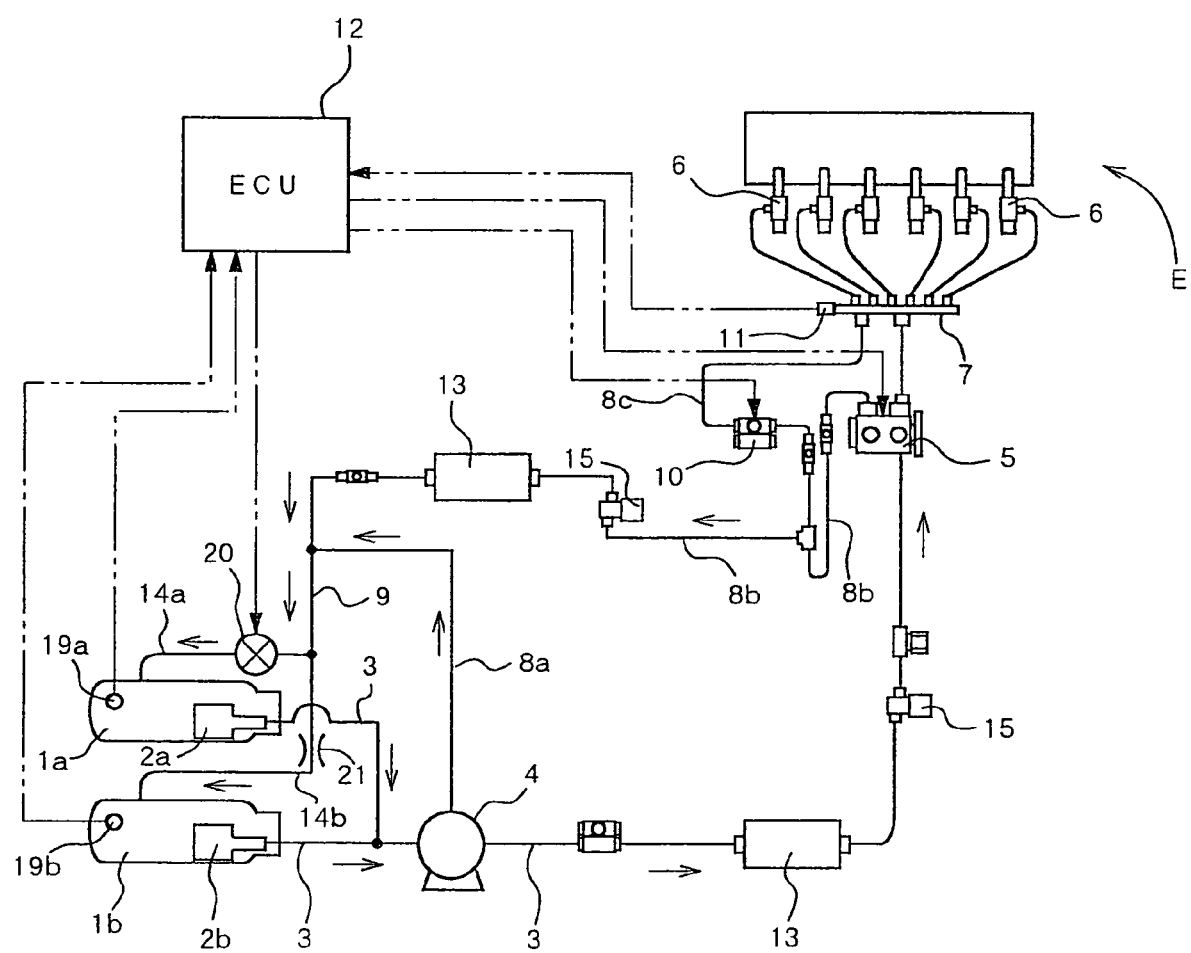
FIG. 2 is a schematic diagram of a fuel return device relating to another embodiment of the present invention.
Figure 3:
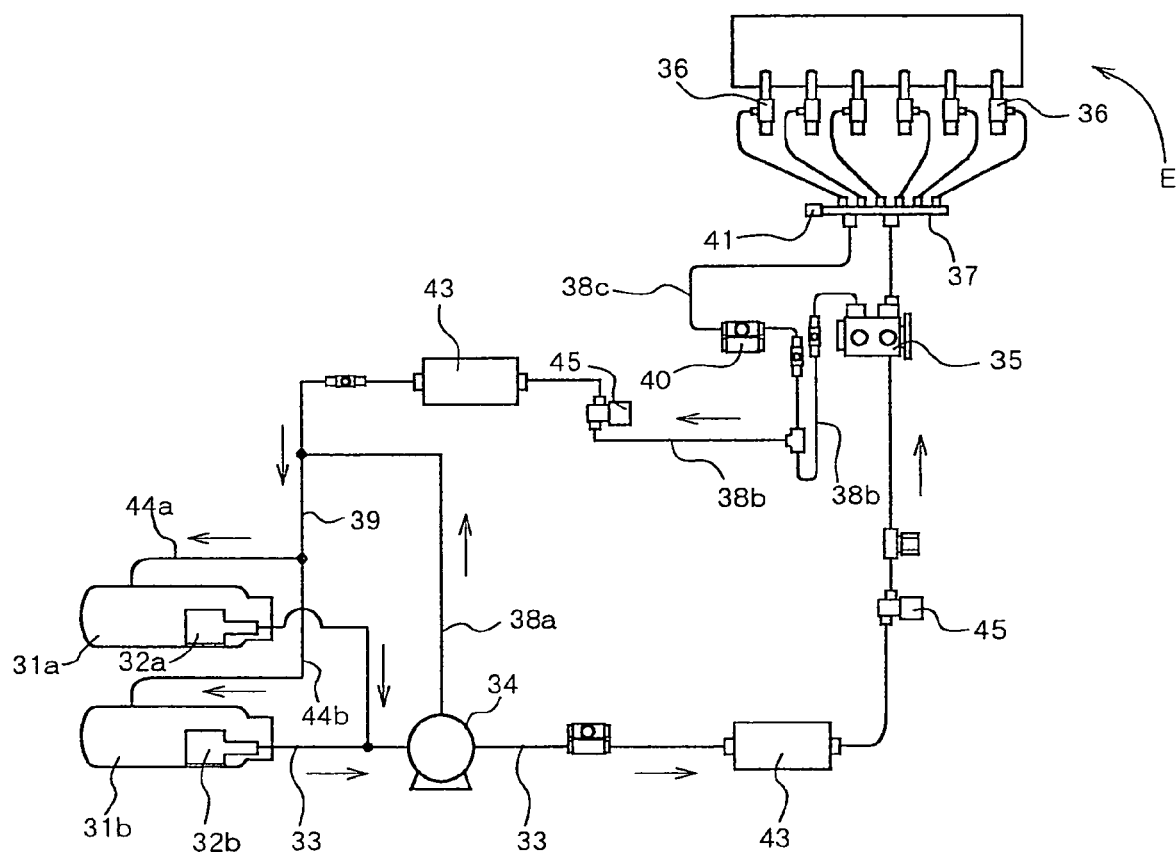
FIG. 3 is a schematic diagram of a conventional fuel return device.

The diaphragm 21 in the embodiment described in FIG. 2 may also be a variable diaphragm, such as a throttle valve, or the like.

The aforementioned two embodiments were described with reference to an internal combustion engine provided with two fuel tanks, but the present invention may of course also be applied to an internal combustion engine provided with more than two fuel tanks.

Furthermore, although the present invention is particularly valuable in relation to DME engines, it may also be applied to other internal combustion engines.

According to the present invention described above, an excellent beneficial effect is displayed in that the residual amounts of fuel in respective fuel tanks can be made equal, in a fuel supply system wherein fuel is supplied simultaneously from a plurality of fuel tanks.

What is claimed is:

1. A fuel return device for an internal combustion engine for recovering surplus fuel supplied to the internal combustion engine simultaneously from a plurality of fuel tanks, and returning the recovered fuel to the respective fuel tanks, comprising:

residual amount detecting means for detecting residual amounts of fuel in the respective fuel tanks; and fuel return distribution adjusting means for adjusting a distribution of fuel returning to the respective fuel tanks, in accordance with values detected by the residual amount detecting means, in such a manner that the residual amounts of fuel inside each of the fuel tanks are approximately equal.

2. The fuel return device for the internal combustion engine according to claim 1, wherein the fuel return distribution adjusting means comprises: a flow rate control valve for adjusting a distribution of flow rate of the fuel returning to the respective fuel tanks; and control means for controlling the flow rate control valve in accordance with values detected by the residual amount detecting means.

3. The fuel return device for the internal combustion engine according to claim 2, wherein the control means calculates the difference between the residual amounts of fuel in the respective fuel tanks on the basis of the values detected by the residual amount detecting means, and controls the flow rate control valve in such a manner that this difference is eliminated.

4. The fuel return device for the internal combustion engine according to claim 1, wherein two fuel tanks are provided, and a first return passage for recovering surplus fuel, and two second return passages branching respectively from the downstream end of the first return passage and connecting respectively to the two fuel tanks, are provided; and the fuel return distribution adjusting means comprises: a three-way electromagnetic valve provided at a connecting section of the first return passage and the second return passages; and control means for controlling the three-way electromagnetic valve in accordance with the values detected by the residual amount detecting means.

5. The fuel return device for the internal combustion engine according to claim 4, wherein the three-way electromagnetic valve comprises one inlet connected to the first return passage and two outlets respectively connected to the two second return passages; and the control means calculates a difference between the residual amounts of fuel in the two fuel tanks on the basis of the values detected by the residual amount detecting means and adjusts an opening ratio between two outlets of the three-way electromagnetic valve in such a manner that this difference is eliminated.

6. The fuel return device for the internal combustion engine according to claim 1, wherein the two fuel tanks are provided, and a first return passage for recovering surplus fuel, and two second return passages branching respectively from a downstream end of the first return passage and connecting respectively to the two fuel tanks, are provided; and the fuel return distribution adjusting means comprises a flow rate control valve interposed in one of the second return passages; control means for controlling the flow rate control valve in accordance with the values detected by the residual amount detecting means; and flow rate restricting means interposed in the other of the second return passages.

7. The fuel return device according to claim 6, wherein the flow rate control valve consists of a two-way electromagnetic valve and the flow rate restricting means consists of a diaphragm.

8. The fuel return device according to claim 7, wherein the flow rate control means consists of a variable throttle valve.

9. The fuel return device according to claim 1, wherein the residual amount detecting means consists of a floating type level gauge.

10. The fuel return device for the internal combustion engine according to claim 1, wherein the internal combustion engine comprises a common rail for accumulating pressurized fuel that is to be injected; each of the fuel tanks respectively comprises a fuel pressure feed pump; and at least one pressure adjusting pump capable of adjusting the output pressure is interposed between the fuel pressure feed pumps and the common rail;

the fuel discharged from the common rail and the fuel discharged from the pressure adjusting pump being returned to the fuel tanks.

11. The fuel return device for the internal combustion engine according to claim 1, wherein the fuel has the property of assuming a gaseous form at normal temperature and atmospheric pressure, and assuming a liquid form when pressurized to a pressure above atmospheric pressure when being used.

12. The fuel return device for the internal combustion engine according to claim 1, wherein the fuel is dimethyl ether.

13. A fuel return method for an internal combustion engine for recovering surplus fuel supplied to the internal combustion engine simultaneously from a plurality of fuel tanks, and returning recovered fuel to the respective fuel tanks; comprising the steps of:

detecting residual amounts of fuel in the respective fuel tanks;

calculating the difference between the residual amounts of fuel in the respective fuel tanks, on the basis of detected values for the residual amounts; and making the residual amounts of fuel in the respective, fuel tanks equal by adjusting a distribution of fuel returning to the respective fuel tanks, in accordance with the difference.

* * * * *